US011304038B2

United States Patent
Legg et al.

(10) Patent No.: US 11,304,038 B2
(45) Date of Patent: Apr. 12, 2022

(54) WIRELESS COMMUNICATION FOR VEHICLE BASED NODE

(71) Applicant: Blu Wireless Technology Limited, Bristol (GB)

(72) Inventors: Peter Jonathon Legg, Bristol (GB); Stuart Ryan, Bristol (GB)

(73) Assignee: Blu Wireless Technology Limited, Bristol (GB)

( * ) Notice: Subject to any disclaimer, the term of this patent is extended or adjusted under 35 U.S.C. 154(b) by 0 days.

(21) Appl. No.: 16/804,800

(22) Filed: Feb. 28, 2020

(65) Prior Publication Data
US 2021/0274325 A1 Sep. 2, 2021

(51) Int. Cl.
| | |
|---|---|
| H04W 4/00 | (2018.01) |
| H04W 4/40 | (2018.01) |
| H04W 76/10 | (2018.01) |
| H04W 16/28 | (2009.01) |
| H04W 72/04 | (2009.01) |
| H04W 72/12 | (2009.01) |

(52) U.S. Cl.
CPC ............ *H04W 4/40* (2018.02); *H04W 16/28* (2013.01); *H04W 72/04* (2013.01); *H04W 72/12* (2013.01); *H04W 76/10* (2018.02)

(58) Field of Classification Search
CPC ....... H04W 4/40; H04W 16/28; H04W 76/10; H04W 72/12; H04W 72/04
See application file for complete search history.

(56) References Cited

U.S. PATENT DOCUMENTS

| | | | | |
|---|---|---|---|---|
| 9,326,274 | B2 * | 4/2016 | Yuk ........................ | H04W 76/11 |
| 9,595,767 | B2 * | 3/2017 | Choudhury ............ | H01Q 25/00 |
| 10,348,394 | B1 * | 7/2019 | Bakr .................... | H04B 7/0408 |

(Continued)

FOREIGN PATENT DOCUMENTS

| | | |
|---|---|---|
| KR | 101 957 786 B1 | 3/2019 |
| WO | 2019120479 A1 | 6/2019 |

OTHER PUBLICATIONS

Yue Guangrong et al: 11 Milli meter-Wave System for High-Speed Train Communications Between Train and Trackside: System Design and Channel Measurements, IEEE Transactions On Vehicular Technology, IEEE Service Center, Piscataway, NJ, US, vol. 68, No. 12, Dec. 1, 2019 (Dec. 1, 2019), pp. 11746-11761, XP011762134, ISSN: 0018-9545, DOI: 10.1109/TVT.2019.2919625 [retrieved on Dec. 16, 2019].

(Continued)

*Primary Examiner* — Amancio Gonzalez
(74) *Attorney, Agent, or Firm* — Optimus Patents US, LLC

(57) ABSTRACT

A communication system supporting communication for nodes of a vehicle (103) comprises wireless access points (203, 205) for communication using directional beams. Wireless modems (701, 703, 111, 113) of the vehicle (103) establish a mm wave radio communication link to an access point (203). The vehicle network transmits link indications to at least one of the access points (203, 205) where a link indication provides a link between a MAC address of a wireless modem (701, 703, 111, 113) and a vehicle identity indication for the vehicle (103). An air interface scheduler (1001) for an access point (201) performs MAC layer scheduling over mm wave radio communication links established for the access point (201) in response to the first vehicle identity indication.

23 Claims, 12 Drawing Sheets

(56) References Cited

U.S. PATENT DOCUMENTS

| | | | |
|---|---|---|---|
| 10,581,164 B2* | 3/2020 | He | H01Q 21/24 |
| 10,608,723 B2* | 3/2020 | Raghavan | H04B 7/0834 |
| 10,631,343 B2* | 4/2020 | Wu | H04W 74/0841 |
| 10,749,254 B2* | 8/2020 | Arnett | H04B 1/40 |
| 10,778,309 B2* | 9/2020 | Raghavan | H04B 7/065 |
| 10,841,781 B2* | 11/2020 | Abedini | H04L 5/005 |
| 10,966,141 B2* | 3/2021 | Cudak | H04W 72/0413 |
| 2006/0268916 A1* | 11/2006 | Sarkar | H04W 4/14 370/431 |
| 2009/0186611 A1* | 7/2009 | Stiles | H04B 7/18506 455/431 |
| 2015/0055564 A1* | 2/2015 | Alam | H04W 52/282 370/329 |
| 2019/0281578 A1 | 9/2019 | Nabetani | |
| 2019/0364492 A1* | 11/2019 | Azizi | H04W 48/16 |
| 2020/0229206 A1* | 7/2020 | Badic | H04W 4/023 |
| 2020/0235791 A1* | 7/2020 | Raghavan | H04W 72/046 |

OTHER PUBLICATIONS

Noh Gosan et al: 11 mnWave-BasedMobile Backhaul Transceiver for High Speed Train Conmunication Systems, 2017 IEEE Globecom Workshops (GC WKSHPS), IEEE, Dec. 4, 2017 (Dec. 4, 2017), pp. 1-5, XP033307269, DOI: 10.1109/GLOCOMW.2017.8269215 [retrieved on Jan. 24, 2018] *Section III.C Baseband Modem Design* * figures 1,3,4 *.

Yue Guangrong et al: "Millimeter-Wave System for High-Speed Train Communications Between Train and Trackside: System Design and Channel Measurements", IEEE Transactions On Vehicular Technology, IEEE Service Center, Piscataway, NJ, US, vol. 68, No.12.

Noh Gosan et al: "mWave-Based Mobile Backhaul Transceiver for High Speed Train Communication Systems", 2017 IEEE Globecom Workshops (GG WKSHPS), IEEE, Dec. 1, 2017 (Dec. 4, 2017), pp. 1-5, XP033307269 , DOI: 10.1109/GLOCOMW.2017.8269215.

* cited by examiner

WIRELESS COMMUNICATION FOR VEHICLE BASED NODE

FIELD OF THE INVENTION

The invention relates to support of communication with a vehicle-based node, and in particular, but not exclusively, to wireless communication for a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast moving vehicles using millimeter-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of air interface in mm wave communication and with potentially fast-moving vehicles is a difficult challenge. This challenge is further exacerbated by the desire to provide this function in communication systems that are compatible with many existing network techniques and principles, such as Internet Protocol based routing, existing network-based mobility functions etc. A particular challenge is how to handle handovers in terms of updating the network operation and data routing as air interface links change.

In general, the efficient usage of the air interface in mm wave communication and with potentially fast-moving vehicles is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast-moving vehicles tend to be suboptimal.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization and in particular air interface resource utilization, improved handover performance, improved performance and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided a communication system for supporting communication between at least one end node of a first vehicle and at least one remote correspondent node via a fixed network, the communication system comprising: a plurality of wireless access points being part of the fixed network, each access point of the plurality of wireless access points having a directional antenna arrangement for mm wave radio communication using directional beams; a number of wireless modems, each wireless modem being located on the first vehicle and arranged to establish a mm wave radio communication link to an access point of the plurality of access points using an electronically steerable beamforming directional antenna, each wireless modem being part of a first vehicle network of the first vehicle; wherein the first vehicle network is arranged to transmit link indications to at least one of the plurality of access points, a link indication providing a link between a MAC address of a wireless modem of the number of wireless modems and a first vehicle identity indication for the first vehicle; and wherein a first air interface scheduler for a first access point of the plurality of access points for performing MAC layer scheduling over mm wave radio communication links established for the first access point in response to the first vehicle identity indication.

The invention may provide improved and/or facilitated operation and/or improved performance for a beamform based mm wave radio communication system supporting (potentially fast) moving vehicles. The approach may in particular provide efficient and reliable communication and may in many embodiments provide improved utilization of the available air interface resource. The approach may in many embodiments provide improved consistency and reduced data interruption and/or performance degradation.

The approach may allow an efficient, high performance, and quick adaptation to changes in access points and network segments supporting communication for the vehicle.

In many systems and scenarios, the use of multiple modems and links for a single vehicle provides a particularly efficient way to maintain connectivity to the vehicle when using mm wave radio communication where conditions may change very fast and very substantially, including new links appearing and disappearing very quickly.

The approach may also be suitable for simultaneous support of multiple vehicles as it provides an approach that easily extends to multiple vehicles.

The use of beams from directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The wireless modems, root, and/or end node may be in/on/attached to/move with etc. the vehicle, and may be part of a mobile network that moves with the vehicle.

According to an optional feature of the invention, the first vehicle network is arranged to transmit a first link indication for a first mm wave radio communication link established between the first access point and a first wireless modem via the first mm wave radio communication link.

According to an optional feature of the invention, the first access point is arranged to receive link indications for a second access point; and the MAC layer scheduling of the first air interface scheduler is arranged to perform the scheduling in response to the link indications for the second access point.

According to an optional feature of the invention, the first access point is arranged to receive the link indications for the second access point from the second access point.

According to an optional feature of the invention, the first access point is arranged to transmit link indications for the first access point to a second access point.

According to an optional feature of the invention, the first access point is arranged to receive link indications only for MAC addresses of wireless modems for which the first access point has established a mm wave radio communication link.

According to an optional feature of the invention, the first access point is arranged to detect that link indications have been received linking a plurality of different MAC addresses to the first vehicle and first scheduler is arranged to perform the MAC layer scheduling in response to the detection.

According to an optional feature of the invention, the scheduler is arranged to select a mm wave radio communication link from the mm wave radio communication links of the plurality of different MAC addresses for communication with the first vehicle.

According to an optional feature of the invention, the first scheduler is arranged to bias resource from a first mm wave radio communication link for a first of the plurality of different MAC addresses to a second mm wave radio communication link for a second of the plurality of different MAC addresses.

According to an optional feature of the invention, the first scheduler is arranged to allocate air interface resource to mm wave radio communication links for the plurality of different MAC addresses in response to radio link condition indications for the mm wave radio communication links.

According to an optional feature of the invention, the radio link condition indications comprise at least one of: signal to noise indications for the mm wave radio communication links; signal strength indications for the mm wave radio communication links; throughput indications for the mm wave radio communication links; and error rate indications for the mm wave radio communication links.

According to an optional feature of the invention, the first scheduler is arranged to schedule data addressed to a first MAC address of the different MAC addresses over a mm wave radio communication link for a second MAC address of the plurality of different MAC addresses.

According to an optional feature of the invention, the first scheduler is arranged to not schedule data addressed over at least one mm wave radio communication link for a first MAC address of the plurality of different MAC addresses in response to the detection.

According to an optional feature of the invention, at least one of the fixed network and the vehicle network comprises a path manager for adapting a route comprising a first MAC address for a wireless modem of the plurality of wireless modems to not include the first MAC address in response to at least one of a throughput and round trip time for the route including the first MAC address being below a threshold.

According to an optional feature of the invention, the path manager is arranged to perform a layer 3 or higher routing change.

According to an optional feature of the invention, the path manager is arranged to perform a layer 2 routing change.

According to an optional feature of the invention, the first access point is arranged to detect that link indications have been received that link MAC addresses to different vehicle identities, and the first scheduler is arranged to perform the MAC layer scheduling in response to the detection.

According to an optional feature of the invention, the first scheduler is arranged to allocate a minimum air interface resource to each vehicle identity of the different vehicle identities.

According to an optional feature of the invention, the first scheduler is arranged to detect that mm wave radio communication links are established to two vehicles to which a second access point has also established mm wave radio communication links; and the first scheduler is arranged to schedule air interface resource to only one of the two vehicles.

According to an optional feature of the invention, the first access point is arranged to select the one of the two vehicles in response to throughput indications for the mm wave radio communication links to the two vehicles from both the first access point and the second access point.

According to another aspect of the invention, there is provided a fixed network for a communication system supporting communication between at least one end node of a first vehicle and at least one remote correspondent node via the fixed network, the fixed network comprising: a plurality of wireless access points being part of the fixed network, each access point of the plurality of wireless access points having a directional antenna arrangement for mm wave radio communication using directional beams; wherein the plurality of wireless access points are arranged to receive transmit link indications for mm wave radio communication links from a number of wireless modems located on the first vehicle and arranged to establish a mm wave radio communication links with the plurality of wireless access points, a link indication providing a link between a MAC address of a wireless modem of the number of wireless modems and a first vehicle identity indication for the first vehicle; and the fixed network further comprising: an air interface scheduler for a first access point of the plurality of access points for performing MAC layer scheduling over mm wave radio communication links established for the first access point in response to the first vehicle identity indication.

According to another aspect of the invention, there is provided an apparatus for a communication system supporting communication between at least one end node of a first vehicle and at least one remote correspondent node via a fixed network, the apparatus being located on the first vehicle and comprising: a number of wireless modems, each wireless modem being located on the first vehicle and arranged to establish a mm wave radio communication link to an access point of a plurality of access points using an electronically steerable beamforming directional antenna, each wireless modem being part of a first vehicle network of the first vehicle; and wherein the apparatus is arranged to transmit link indications to at least one of the plurality of access points, a link indication providing a link between a MAC address of a wireless modem of the number of wireless modems and a first vehicle identity indication for the first vehicle.

According to another aspect of the invention, there is provided a method of operation for a communication system for supporting communication between at least one end node of a first vehicle and at least one remote correspondent node via a fixed network, the communication system comprising: a plurality of wireless access points being part of the fixed network, each access point of the plurality of wireless access points having a directional antenna arrangement for mm wave radio communication using directional beams; a number of wireless modems, each wireless modem being located on the first vehicle and arranged to establish a mm wave radio communication link to an access point of the plurality of access points using an electronically steerable beamforming directional antenna, each wireless modem being part of a first vehicle network of the first vehicle; the method comprising: the first vehicle network transmitting link indications to at least one of the plurality of access points, a link indication providing a link between a MAC address of a wireless modem of the number of wireless modems and a first vehicle identity indication for the first vehicle; and a first air interface scheduler for a first access point of the plurality of access points performing MAC layer scheduling over mm wave radio communication links established for the first access point in response to the first vehicle identity indication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
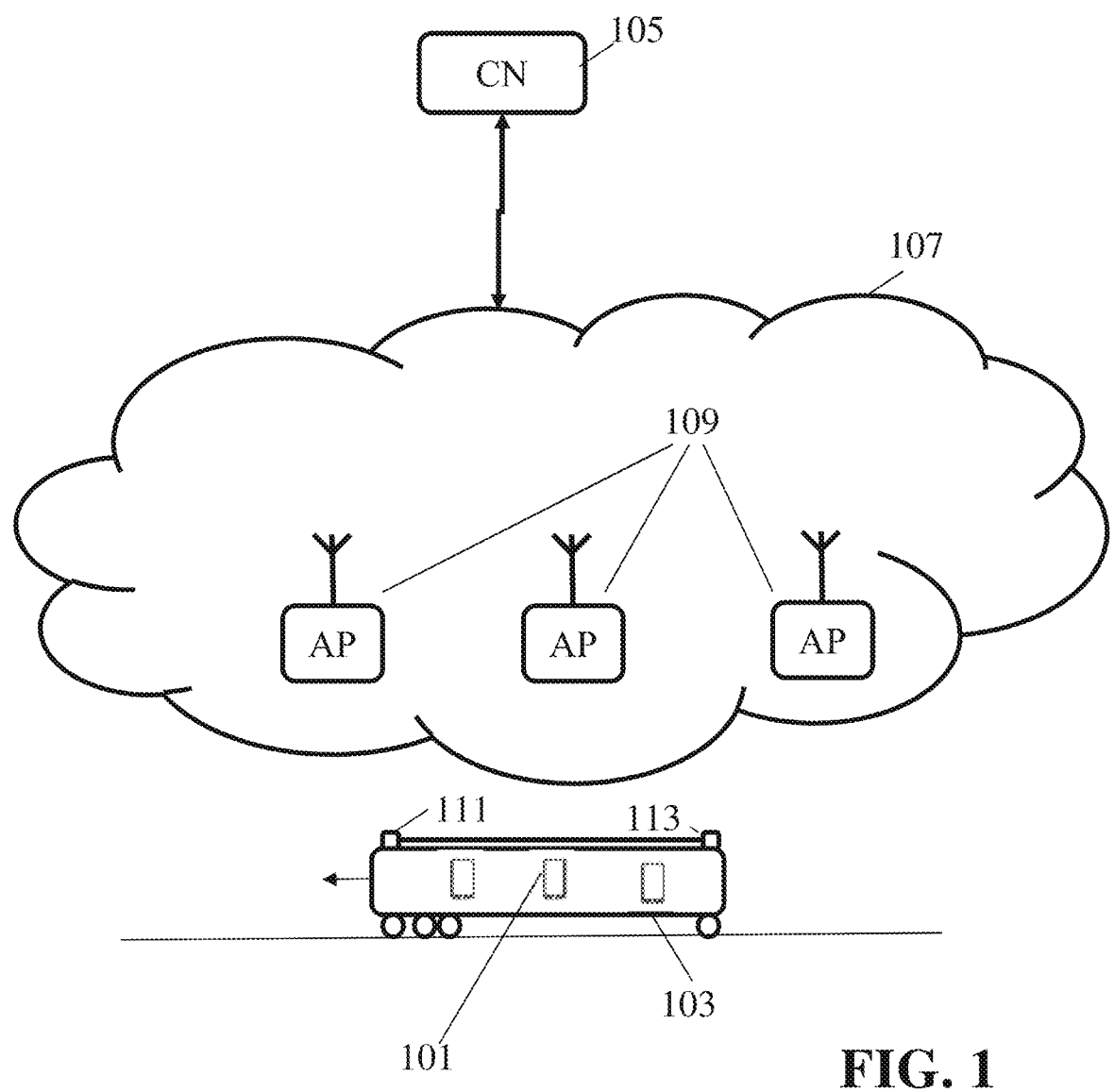
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the correspondent node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the correspondent node 105 to a node of the fixed network or e.g. it may be a connection which is provided by a network coupled to both the fixed network 107 and the correspondent node 105. The network may in particular be the Internet, and the coupling of the correspondent node 105 to the fixed network 107 may be via an Internet connection. It will also be appreciated that the fixed network 107 itself may be considered fully or partially part of the Internet and/or that the Internet may form part of the fixed network 107.

It will be appreciated that although FIG. 1 (and the following) figures focusses on description of communication for one end node, the system will typically support simultaneous communication for a large number of end nodes and in many embodiments, the combined data rate for communication to/from the vehicle may be in the order of several tens or even hundreds of Gigabit per second.

The coupling of the fixed network 107 to nodes on the train 103 is supported by wireless radio communication links. For this purpose, the fixed network 107 comprises a plurality of wireless access points (APs) 109 which in the specific example may be a relatively large number of stationary access points e.g. positioned along train tracks to support communication for a train.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113.

In the specific embodiment of using the IEEE 802.11ad wireless technology, the AP and the two modems would form a BSS (basic service set). A scheduler may accordingly allocate data packets to an individual link by associating them with the appropriate MAC address. In particular, each AP may comprise a MAC layer scheduler which performs scheduling of date over the air interface of the AP based on MAC addresses. In many systems, the scheduling is based on a TDMA scheduling allocating time intervals/slots for individual air interface links (in some embodiments allocation may be in fixed duration time slots but in other systems allocation may be in variable duration time slots or intervals).

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m–1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but may be limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train.

Figure 2:
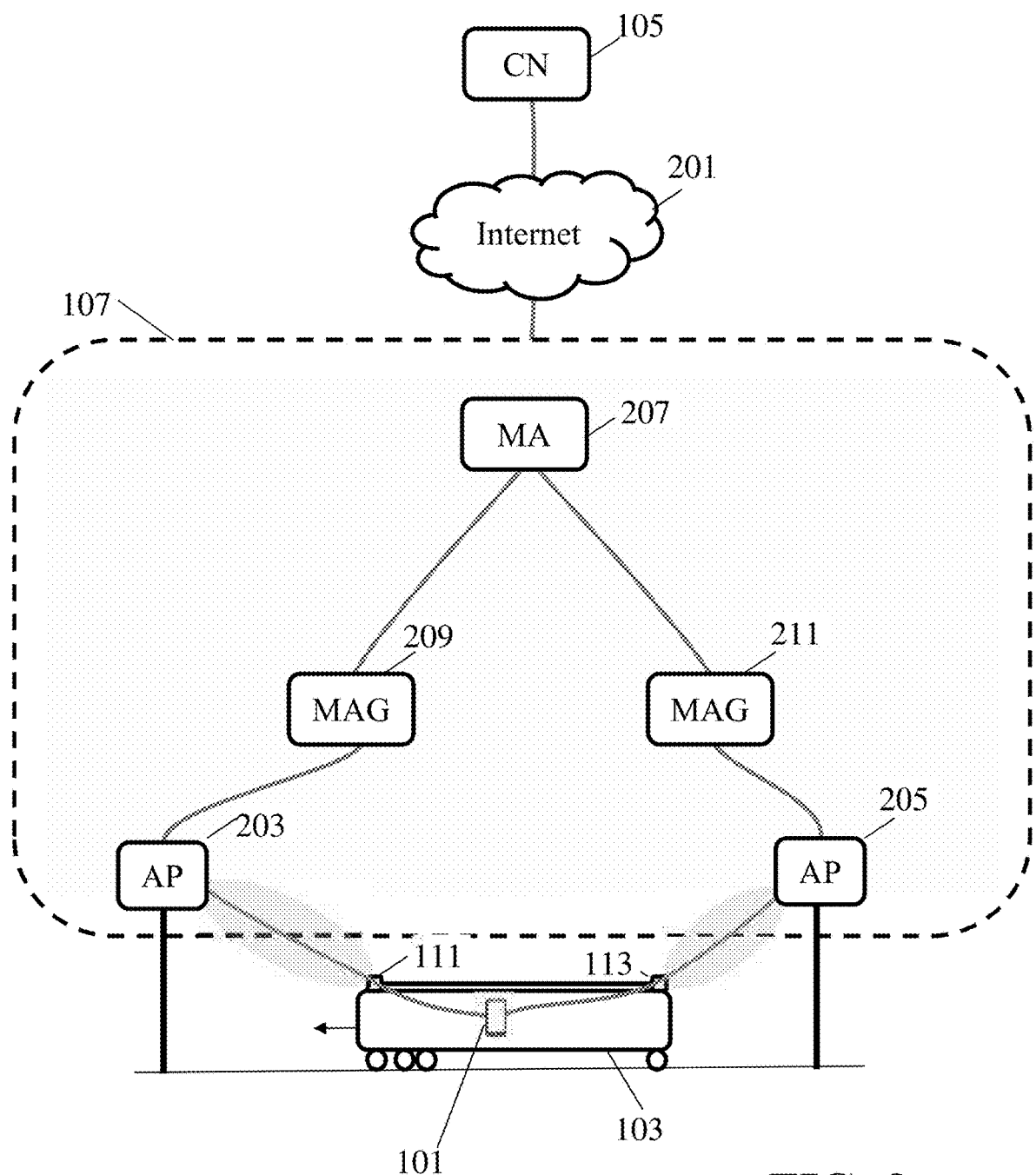
FIG. 2 illustrates an example of elements of a wireless communication system in accordance with some embodiments of the invention.

FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 may in some examples comprise a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205. Indeed, each MAG 209, 211 may be associated with a different segment of the network.

The mobility anchor 207 is accordingly a common mobility anchor for a plurality of the wireless modems 111, 113 of the train 103, and typically for all of the wireless modems 111, 113.

In many practical systems, some or all of the access points 109 may be substantially colocated and coupled together through network entities that allow short routing paths between them.

Figure 3:
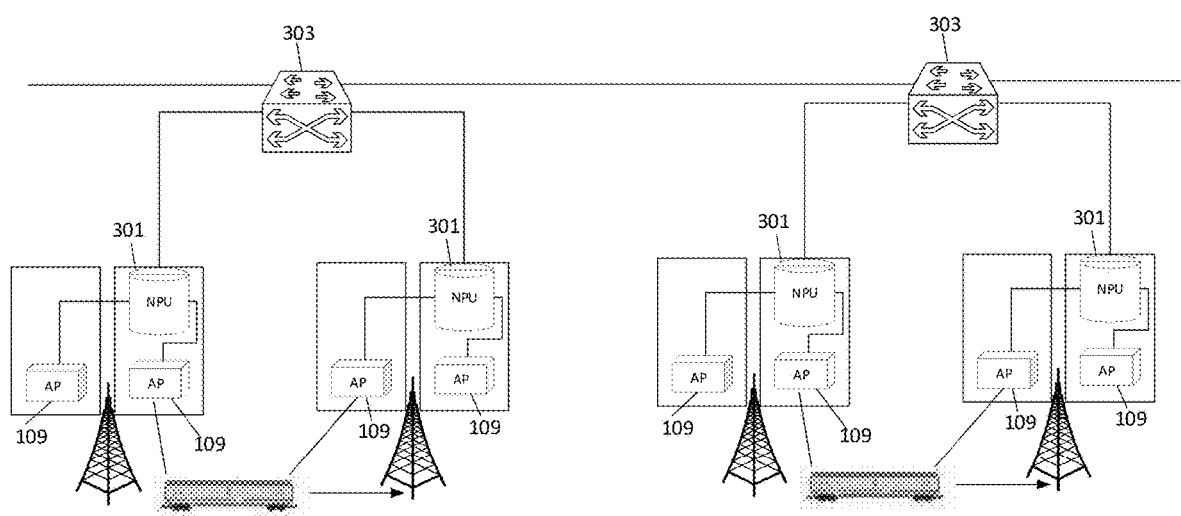
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions. Thus, the access points 109 may comprise a directional antenna arrangement which forms directional beams to support the mm wave radio communications. In some embodiments, the directional antenna arrangement may be arranged to dynamically beam form and steer beams towards wireless modems on the vehicle, i.e. dynamic beam adaptation and steering may be employed. In other embodiments, the directional antenna arrangement may form static beams that are in a given, typical predetermined direction. For example, for access points next to a train track, a static beam in the direction along the track may be formed.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. The switches or routers 303 may further connect to the rest of the fixed networks, e.g. through interface routers/switches 305.

Figure 4:
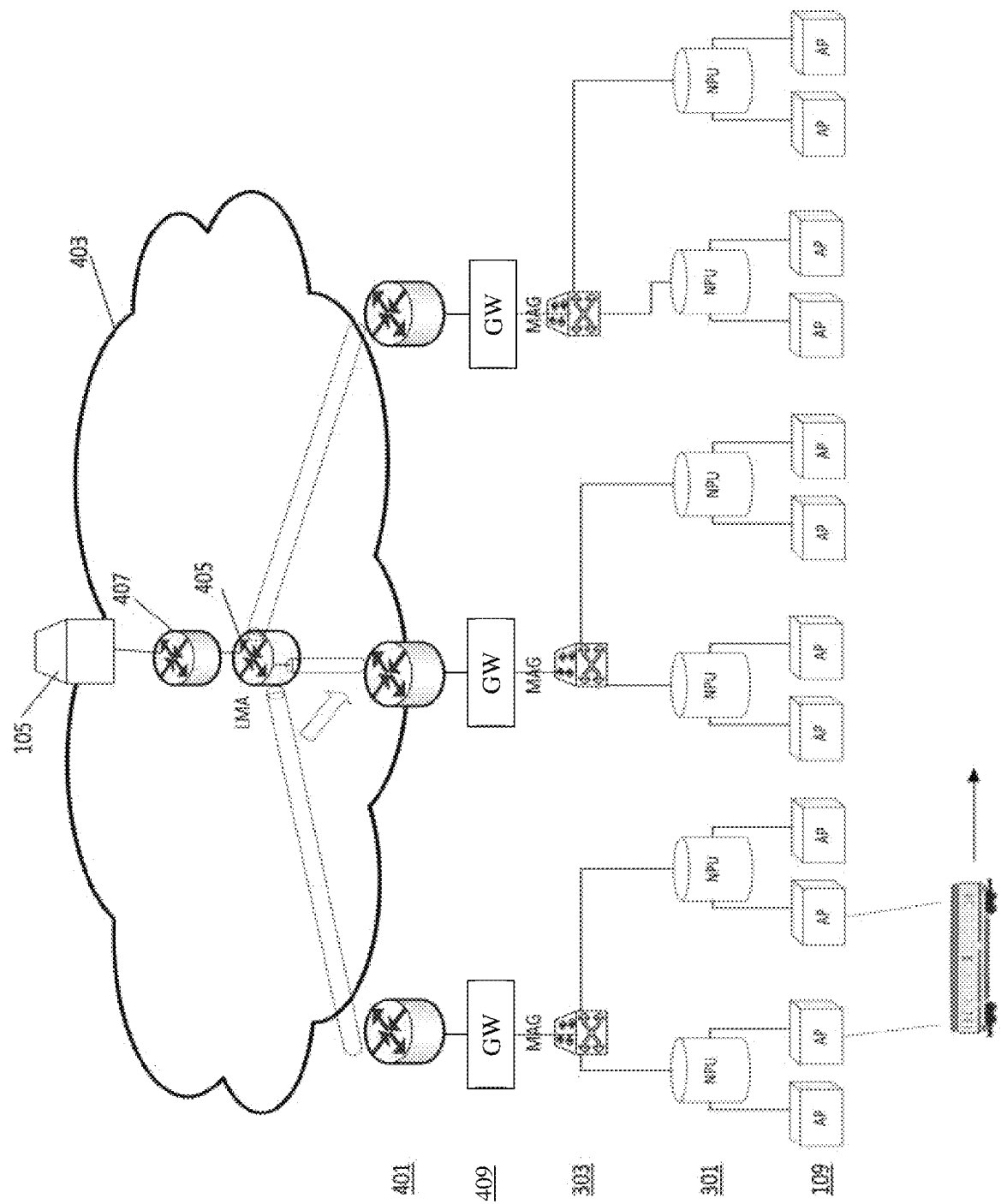
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections and gateways.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

Figure 5:
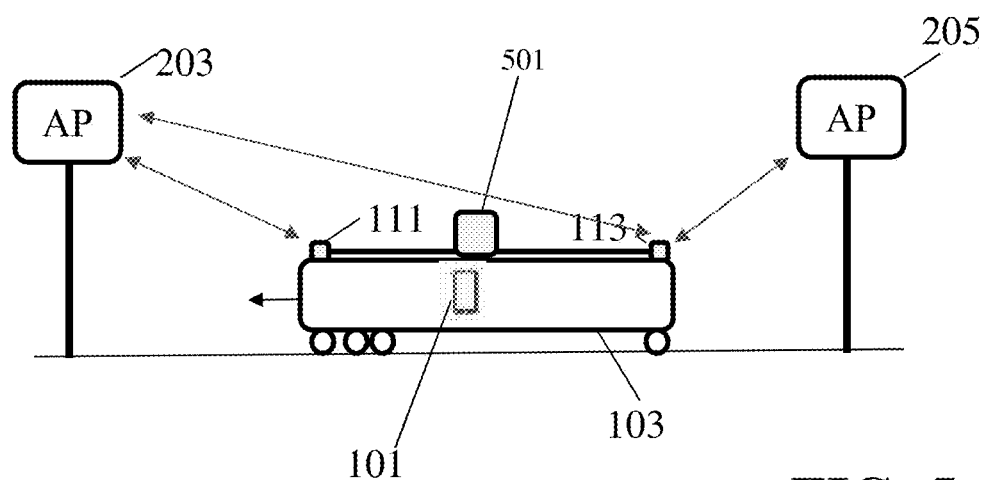
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed. Thus, the wireless modems 111, 113 may be part of a vehicle network that supports communication for end nodes. The network may for example include IEEE 802.11 network elements and access points for the end nodes.

Figure 6:
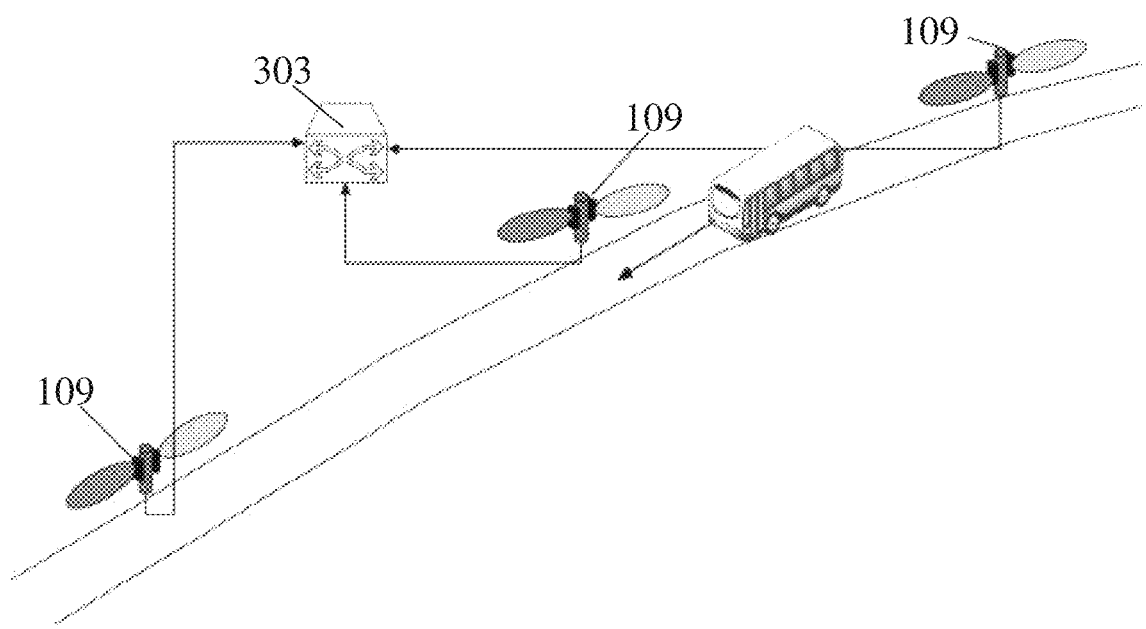
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the forwards and in the backwards direction. Similarly, rather than having a single wireless modem towards the back of the vehicle/train, there may be two wireless modems forming beams respectively in the forwards and in the backwards direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

Figure 7:
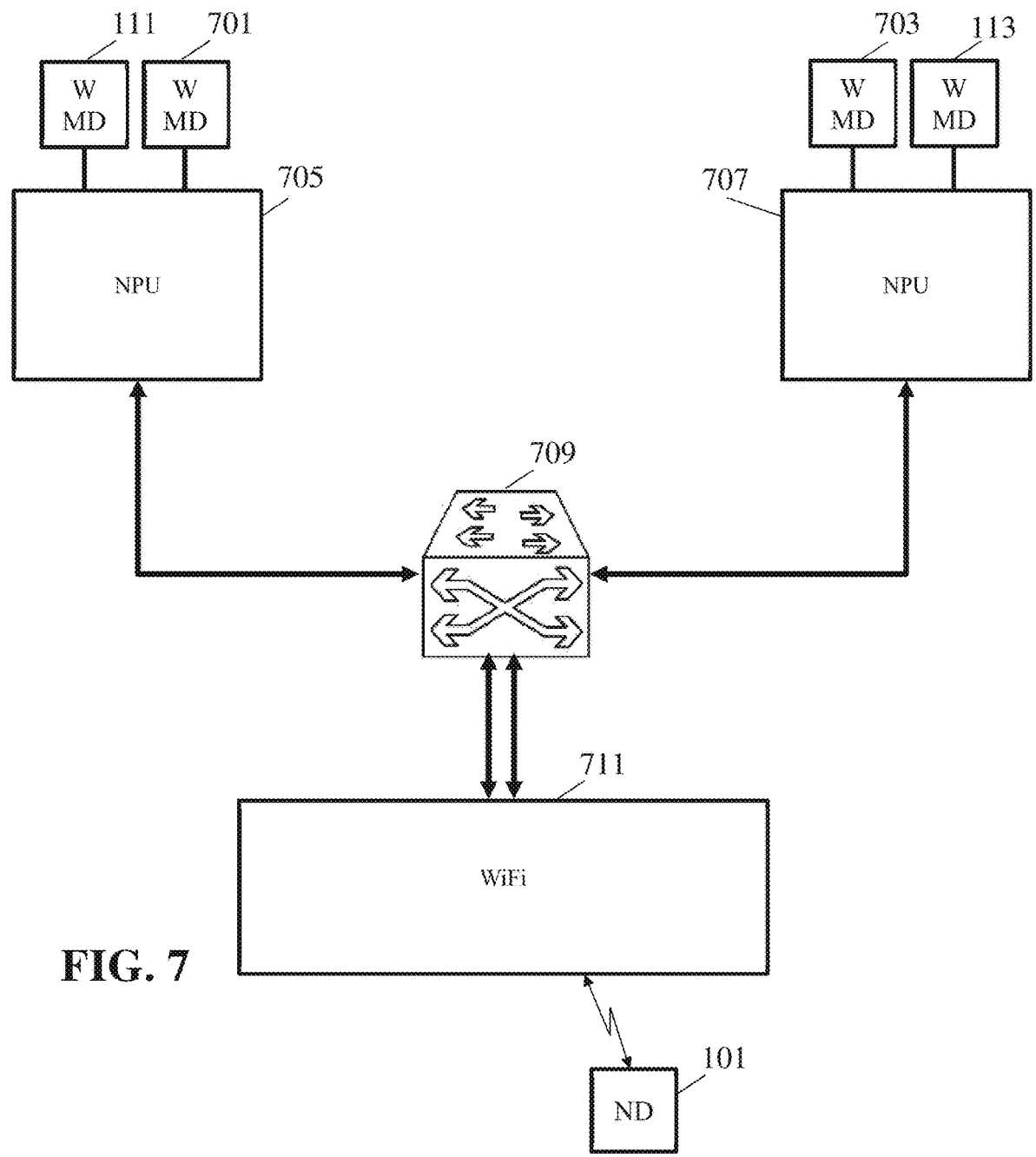
FIG. 7 illustrates an example of elements of a vehicle based network subsystem of a wireless communication system in accordance with some embodiments of the invention.

FIG. 7 illustrates an example where a moving vehicle may comprise four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a Wi-Fi subsystem 711. The NPUs 705, 707 and WiFi subsystem 711 may specifically be coupled to the switch 709 via Ethernet connections and the switch 709 may be an Ethernet switch. The WiFi subsystem 711 may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem 711 may for example be a conventional WiFi system such as an IEEE 802ac (or earlier) system. Thus, a user on a moving vehicle, such as a train, may simply access a conventional local WiFi access point to gain Internet access.

In the system described, the wireless modems employ electronically steerable beamforming directional antenna that form a beam, and more specifically that form a directional pattern having a main beam that can be steered. Further, in the example two colocated wireless modems may employ directional antennas that may form a beams in different directions, such as e.g. in a forwards direction or range of directions and a backwards direction or range of directions respectively.

E.g., in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the forwards direction of the vehicle and the other being pointed in the backwards direction of movement. Similarly, the other two co-located modems 113, 703 may employ directional antennas that are also directed in opposite directions, specifically in the direction of movement and in the opposite direction (forward/backwards). This may result in two wireless modems 111, 703 having beams formed generally in the forward direction (direction of movement) and two modems 113, 701 having beams formed generally in the backward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna coefficients to direct the main beam towards the relevant access points, e.g. by applying a beam steering algorithm maximizing the received signal strength or signal to noise ratio as well known in the art. As another example, more mechanical solutions may be used. For example, horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the forwards direction may both be suitable for establishing a wireless link with an access point 109 further ahead along the route/track. Similarly, the two wireless modems having beams pointing in the backwards direction may both be suitable for establishing a wireless link with an access point 109 being further backwards along the tracks.

Figure 8:
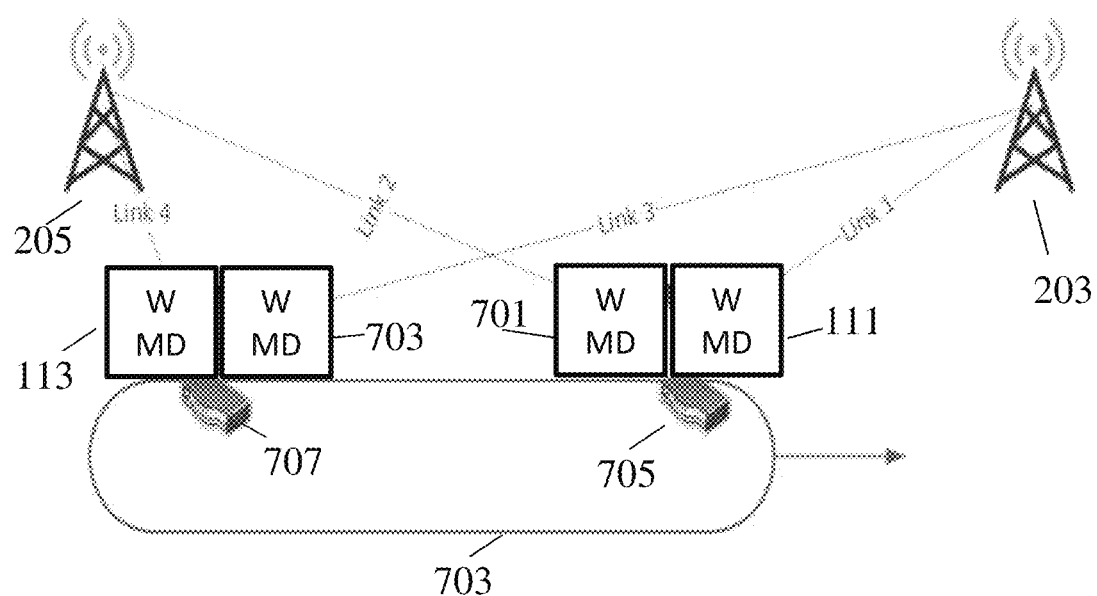
FIG. 8 illustrates an example of elements of a wireless communication system in accordance with some embodiments of the invention.
Figure 9:
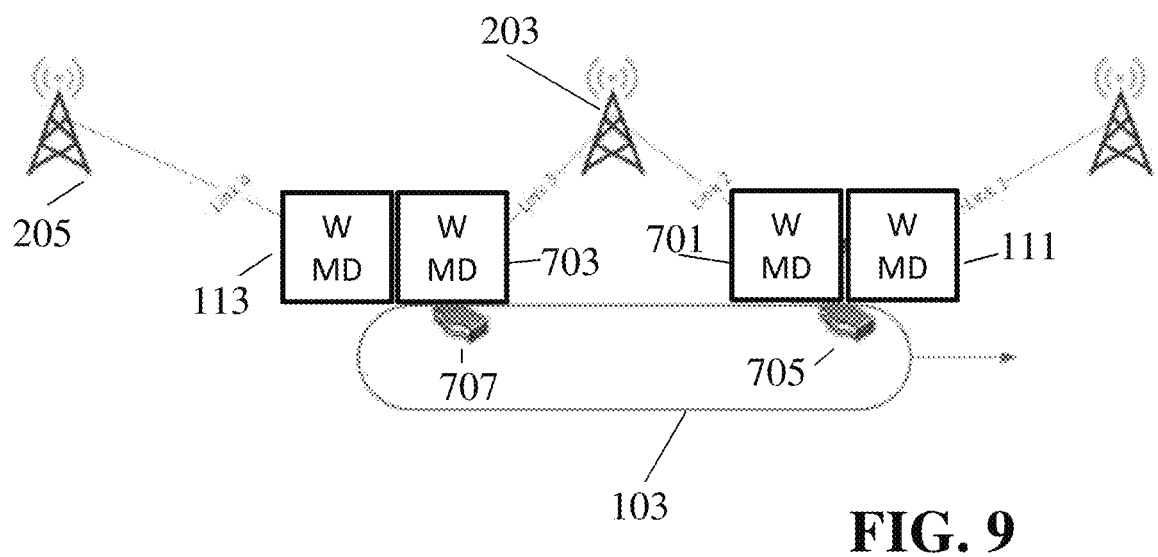
FIG. 9 illustrates an example of elements of a wireless communication system in accordance with some embodiments of the invention.

Similarly, the beam steering may be towards an access point rearwards of the vehicle train 103 and this may indeed be simultaneous with another of the colocated wireless modems steering a beam towards a forward access point. Thus, often a situation may occur where one set of colocated wireless modems have established links with respectively a forwards and rearwards access point and thus forms beams in substantially opposite directions. At the same time, the other set of colocated wireless modems may have established links with respectively a forwards and rearwards access point and thus also form beams in substantially opposite directions. Further, one pair of non-colocated wireless modems may form beams towards the forwards access point and thus substantially in the same forwards direction, and another pair of non-colocated wireless modems may form beams towards the rearward access point and thus substantially in the same rearwards direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with three different access points.

Thus, the vehicle, such as a train or a bus, may comprise sets of wireless modems that may be reached through a common network element, and specifically via a single common connection point of the common network element. The examples of FIGS. 7, 8 and 9 employs two pairs of such modems. Typically, the modems that can be reached through a single common connection point and the common network element are substantially co-located and the modems of such a set will for brevity be referred to as co-located modems. However, it will be appreciated that it is not essential for such modems to be co-located.

The vehicle may typically comprise a plurality of such sets of wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the forwards direction and one wireless modem facing in the backwards direction. In such scenarios, wireless modems in different sets being arranged to form beams in corresponding directions will be referred to as aligned wireless modems.

The approach may in particular allow each set of co-located wireless modems to form mm wave radio communication links to different access points and may also allow different sets of co-located wireless modems to form links to the same access point. For example, in FIGS. 7 and 8, wireless modem 111 and aligned wireless modem 703 are arranged to establish mm wave radio communication links to the same access point 109. This may provide more efficient communication over the radio air interface in many embodiments and may allow a fast and efficient adaptation to the current radio conditions. This is particularly significant for mm wave radio communication for moving vehicles as the conditions for individual links may change exceedingly quickly and substantially. The approach may provide additional air interface diversity which can increase overall throughput.

Thus, for brevity, conciseness and clarity, modems having the beams formed in substantially the same direction will be referred to as aligned wireless modems and the description will focus on a vehicle comprising a pair of aligned wireless modems having forward facing beams and a pair of aligned modems having rearward facing beams. Beams and radio communication links from different wireless modems to the same access point will also be referred to as aligned beams and aligned radio communication links. Similarly, for co-located modems, the beams and radio communication links will also be referred to as co-located beams and radio communication links.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle.

In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and backwards facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

A critical operation for communication systems, such as those described, is the efficient use of the air interface resource. For a system based on mm wave radio communication links supporting fast moving vehicles it is imperative that the resource allocation operation is able to adapt very quickly to changing conditions. In order to ensure fast adaptation, it is typically advantageous to perform resource allocation locally and for it to be based on consideration that takes into account sufficiently fast changing parameters.

In the described system, air interface scheduling for a given access point is typically performed locally to the access point, and typically the access points comprise an air interface scheduler that is arranged to schedule data for communication over the mm wave radio communication links of the access point.

Thus, an air interface scheduler may be part of an access point, and indeed each access point may comprise a corresponding radio link/air interface scheduler arranged to schedule data communication over the air interface of that access point.

Such a scheduler may allocate time slots/intervals and/or frequency channels to data to be communicated to or from the vehicle. For example, the wireless air interface between access points and wireless modems may be based on mm wave communication such as the IEEE 802.11ad using communications in the 60 GHz band. Each base station may be assigned a single frequency channel which may be the same or different from the frequency channel of a colocated access point. The use of a different channels may reduce the modem to modem interference when the vehicle is located astride the mast supporting the co-located access points. For example, for a system supporting communication on a train, a first frequency channel may be assigned to all upstream facing access points and a second frequency channel may be assigned to all downstream facing access points. In this case, the downlink and uplink interference impacting the radio links may typically be relatively low for most locations along the track.

Within a given frequency channel assigned to an access point, individual data may be scheduled in time allocations. Specifically, the scheduling may be performed in scheduling intervals where each scheduling interval comprises a plurality of time allocations which may be allocated to specific communications and for communication of specific data packets. The time allocations may be allocated to uplink or downlink traffic, i.e. to communication to or from the access points. The time allocations may be of variable or fixed duration (also known as slotted). The system may thus use Time Division Duplex (TDD) to share the air interface resource.

Further, in many embodiments, an access point may use Time Division Multiple Access (TDMA) to communicate with a plurality of wireless modems. Thus, different time allocations may be allocated to communication to different aligned wireless modems.

Further, in some embodiments, the air interface communication may use OFDM (Orthogonal Frequency Division Multiplexing) and the scheduling of data may further take this into account. For example, different OFDM channels may be allocated to different communications.

Thus, an air interface scheduler of an access point may be arranged to schedule data for communication over the air interface between the access point and a plurality of wireless modems. As a given access point may be capable of simultaneously establishing a plurality of mm wave radio communication links, the scheduling of data may be for a plurality of wireless modems. For example, mm wave radio communication links may simultaneously be established to different wireless modems of the same or different vehicles. In particular, the use of wireless modems with aligned beams on the vehicle may provide multiple possible paths to end nodes on the same vehicle from a given access point.

In the described embodiments, the air interface scheduler(s) of the access point(s) is(are) arranged to perform MAC layer scheduling over mm wave radio communication links established for the first access point in response to the first vehicle identity indication. The scheduling is accordingly based on the MAC addresses and specifically the scheduling is of data packets based on the destination and/or source MAC address(es) of the data packet. Specifically, in many embodiments, the MAC layer scheduling may be a scheduling of data based on the MAC addresses of wireless modems associated with each mm wave radio communication link established for the access point.

In many embodiments, the scheduling may not be based on any higher layer data comprised in the data packets being scheduled, and specifically may not be based on any layer 3 or higher addresses of the data packets. In particular, the scheduling may not consider any IP addresses for the data packets. In many embodiments, the scheduling may not be based on or dependent on any parameter of higher layer than Layer 2 (L2) carried within the packet.

As an example, the access point may implement a buffer for each established mm wave radio communication link (in a given direction) with the buffer being associated with the MAC address of the wireless modem with which the mm wave radio communication link is established. Data packets are allocated to the buffer associated with a MAC address corresponding to an appropriate destination MAC address of the data packet.

The scheduler may then allocate time slots to the different buffers and thus the different MAC addresses. Different algorithms and criteria may be used. For example, the scheduling may be made in dependence on the current buffer fill level as well as on the radio conditions (e.g. signal strength, current throughput) for the mm wave radio communication links. E.g. time slots may be allocated to the MAC address/mm wave radio communication link/buffer such that all buffers remain below a given fill level threshold. Any remaining time slots in a given frame may then be allocated in proportion to the current throughput.

The use of a local access point based MAC scheduler allows for fast and adaptive scheduling. In many embodiments, the air interface communications are based on L2 communication, and indeed this may typically be inherent and a fundamental constraint of the design of the communication system. Accordingly, it is in many systems a requirement that the air interface scheduling is a L2 scheduler based on MAC addresses.

In many embodiments, the access points are part of a L2 switched network section and since the air interface communication uses layer 2 (MAC) this accordingly also provides for a lower complexity network that can e.g. employ bridging.

However, whereas MAC layer scheduling may provide highly efficient operation in many scenarios, the Inventor has realized that it may not provide optimal resource allocation in all situations.

In the described system, the vehicle network comprises functionality for communicating link indications to the fixed network, and specifically link indications may be transmitted to the access points over the mm wave radio communication links. A link indication provides a link between a MAC address of a wireless modem and a vehicle identity (indication) for the vehicle. Specifically, a link indication may be provided for each mm wave radio communication link established by a wireless modem of the vehicle and thus a vehicle identity is provided for each mm wave radio communication link.

Further, in the system, the air interface scheduler for performing MAC layer scheduling over mm wave radio communication links established for the access point is arranged to further perform the scheduling in dependence on the vehicle identity indications for the mm wave radio communication links, and specifically is arranged to perform scheduling for a mm wave radio communication link supported by the access point based on the vehicle identity that has been linked to that mm wave radio communication link.

In the system, the vehicle side of the network/system may accordingly provides information to the fixed network side, and specifically to the access point/air interface schedulers of which vehicle the wireless modems belong to, and thus to which vehicle the mm wave radio communication links are established. The air interface schedule may then take this into account and e.g. differentiate the scheduling based on whether different mm wave radio communication links exist for the same vehicle or not.

The approach thus allows improved and more flexible scheduling to be performed by MAC layer scheduling by obtaining and utilizing additional vehicle identity information that is not generally available to L2 operations. In particular, L2 and MAC addresses provide only information for the specific path/mm wave radio communication link and does not provide any information of any relations between different mm wave radio communication links. In the current approach, the air interface scheduler may perform MAC scheduling, and thus localized, adaptive, and fast operation is achieved, while at the same time achieving a more efficient scheduling. The approach may specifically provide increased throughput and/or combined air interface resource as improved adaptation to the fast changing radio conditions can be achieved. Specific exemplary approaches of specific scheduling algorithms will be described in more detail later.

In many embodiments, the vehicle identity may be any identification that allows the fixed network to determine whether wireless modems and mm wave radio communication links are for the same vehicle/vehicle network or not.

In many embodiments, the vehicle identity is a data sequence/pattern that is different from data sequences/patterns that may be used as a vehicle identity for other vehicles that the access point may select. In many embodiments, the system may establish a set of different identities that may be assigned to individual vehicles and used by the vehicle to link mm wave radio communication links to the vehicle in the link indications. In some embodiments, the vehicle identity may be, or may be derived from, a network address. For example, in some embodiments, each vehicle may be allocated a unique IP address (or set of IP addresses), and this IP address (or one from the set of IP addresses) may be used as a vehicle identity. In other embodiments, the vehicle identity may be generated by the vehicle itself without any interaction with any other functionality. For example, a long data pattern (say 16-24 bits) may be generated by a vehicle and used as a vehicle identity for the current journey. If such identity generation is completely separate, it may be possible that two vehicles coincidentally generate the same identity but by using a sufficiently long identity the risk of this may in many embodiments be kept sufficiently low to be acceptable.

This may provide a particularly efficient and low complexity system with information being provided directly to an access point for which the scheduling may take the link indications into account. This may allow for an efficient and localized scheduling for the access point. It may reduce the communication and complexity of the required functionality and may facilitate introduction of the enhanced functionality to existing networks and systems. For example, for a MAC layer scheduler located at the individual access point, the functionality, e.g. the software of the access point, may simply be updated such that a received link indication data message/packet is forwarded to the scheduling function with this being updated to implement an algorithm using the vehicle identity.

In other embodiments, communication of a vehicle identity may alternatively or additionally be via a different mm wave radio communication link than the one for which the link indication is provided. For example, it may be provided on another mm wave radio communication link established by another wireless modem on the same vehicle. For example, one wireless modem may transmit a data message which provides a vehicle identity and the lists all the MAC addresses of wireless modems on that vehicle.

In some embodiments, it is indeed even possible that the link indication for a given link is transmitted via a different access point. For example, a message providing the vehicle identity and listing all MAC addresses for wireless modems may be transmitted to one access point and this may be arranged to forward the information to other access points, e.g. within a given distance.

It will also be appreciated that the link indication may be provided to the fixed network and scheduler in any suitable way. In many embodiments, the system may be arranged to transmit link indications for a specific link via the mm wave radio communication link to which it relates. Thus, in many embodiments, the link indication linking the vehicle identity to a specific wireless modem may be transmitted to the access point supporting that link/wireless modem from the wireless modem.

The specific way the link indication provides the linking between the vehicle and the wireless modem may be different in different embodiments. For example, as mentioned, in some embodiments a link indication may specifically be provided by a data message listing a vehicle and one or more wireless modem MAC addresses. In other embodiments, the indication may be more indirect. For example, in embodiments where the link indication is transmitted from the wireless modem for which the link indication is provided, it may be sufficient to include the vehicle identity in the link indication with the MAC address implicitly being provided by the source of the message (in many such cases the MAC address of the source wireless modem may be included in the data packet but this is not strictly necessary if e.g. the link is already linked to a wireless modem MAC address by the access point). In some embodiments, the link indication may be provided in a dedicated data packet but in other examples it may be included in a data packet transmitted for other purposes, such as e.g. by including a vehicle identity in data packet being part of the user data flow between and end node and a correspondent node (for example including the vehicle identity in an optional field of such a data packet/message).

The link indication may be provided at any suitable time and e.g. in response to any suitable event or condition occurring. In some embodiments, the link indication may be transmitted on a given mm wave radio communication link whenever that mm wave radio communication link is being established/initialized. In other embodiments, the link indication may for example be provided e.g. when the vehicle commences on a new journey.

The approach will be described in more detail with reference to FIGS. 10-12 which illustrate a first and second access point 203, 205 comprising a first and second scheduler 1001, 1003 respectively. The access points 203, 205 are coupled to the rest of the fixed network, in the figures exemplified by the MAGs 209. In the examples, the first scheduler 1001 is arranged to perform L2 scheduling for the mm wave radio communication links established with the first access point 203 and the second scheduler 1003 is arranged to perform L2 scheduling for the mm wave radio communication links established with the second access point 205.

Figure 10:
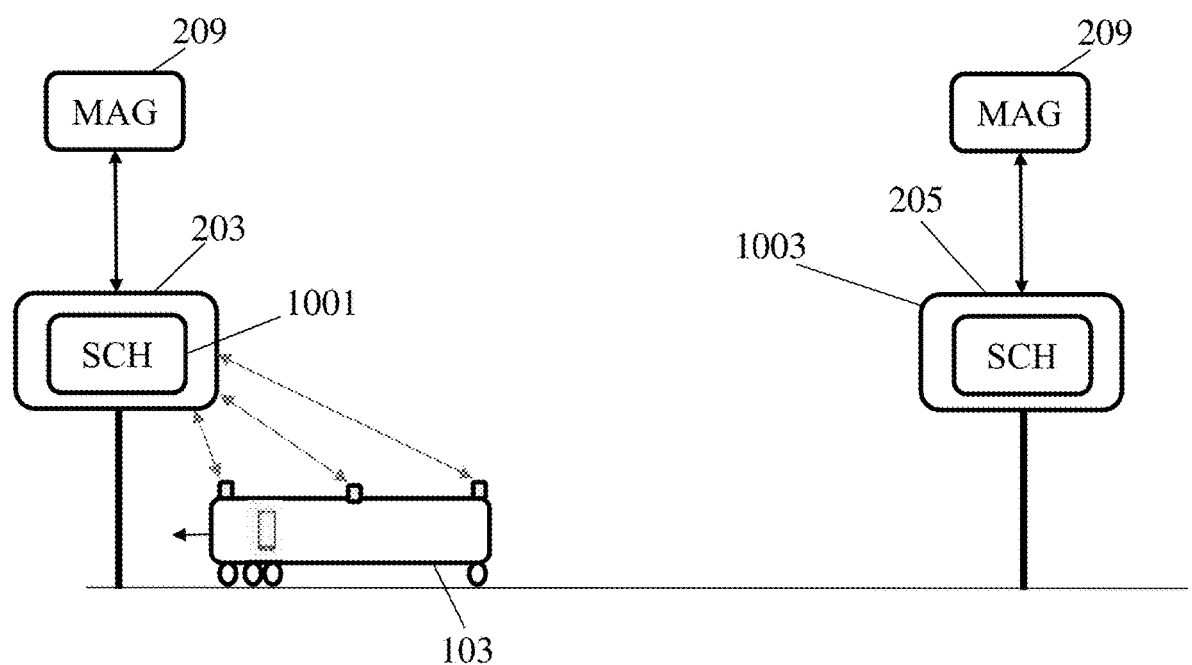
FIG. 10 illustrates an example of elements of a wireless communication system in accordance with some embodiments of the invention.

In the example of FIG. 10, the three of the four (in the specific example) wireless modems of vehicle 103 has established mm wave radio communication links to the first access point 203 and the first scheduler 1001 schedules data over these three mm wave radio communication links. However, rather than just scheduling data based on the MAC destination addresses for the data packets, the first scheduler 1001 is further arranged to consider the vehicle identity associated with the wireless modems. Thus, the first scheduler 1001 does not merely maintain a separate buffer/queue for each wireless modem MAC address, and then schedule data for these buffers without any consideration of any relationship between the corresponding links but instead may further consider whether the buffers relate to wireless modems/mm wave radio communication links for the same vehicle or for different vehicles.

As a specific example, the first scheduler 1001 may group links to the same vehicle and perform a joint/combined scheduling for all of these links taking into account properties for all links.

For example, in some embodiments, the first scheduler 1001 may be arranged to group all links to the same vehicle and to schedule data for only a subset, and specifically for only one, of these links, and specifically only to the link(s) that currently provides the highest throughput. For example, for a given frame, a number of time slots may be available for communication to the vehicle and all of these may be allocated to the link to the vehicle that currently has the highest throughput. Thus, rather than using a MAC layer scheduling that schedules for individual links resulting in time slots being allocated both to links with high throughput and links with low throughput, this approach may always select the best link available to a given vehicle thereby maximizing the throughput for that vehicle. This may provide an improved utilization of the air interface resource.

The first scheduler 1001 may in many embodiments impose a common scheduling restriction/constraint for a group of links to the same vehicle. For example, the first scheduler 1001 may require the scheduling to be such that a minimum throughput is provided for each group/vehicle but without having any minimum throughput requirements for the individual mm wave radio communication link.

In some embodiments, the first access point 203 and/or the first scheduler 1001 may be arranged to receive link indications only for MAC addresses of wireless modems to which the first access point has established a mm wave radio communication link. The first scheduler 1001 may specifically be arranged to perform scheduling for the mm wave radio communication link established by the first access point 203 based on consideration of vehicle identities only for the mm wave radio communication link established by the first access point 203. Specifically, the first scheduler 1001 may simply perform a local scheduling based only on information for the established mm wave radio communication links from the first access point 203, such as e.g. as described in the examples above.

As described in the examples, the first scheduler 1001/first access point 203 may specifically be arranged to detect that link indications have been received linking a plurality of different MAC addresses to the same vehicle and the MAC layer scheduling may perform the scheduling in response to the detection, for example by selecting between different links to the same vehicle and/or ensuring a maximum combined throughput to a vehicle.

In the specific example, the MAC layer scheduling is arranged to select one link out of the mm wave radio communication links that are formed to the same vehicle, i.e. for which link indications have been received with the same vehicle identity. However, in some embodiments, the scheduling may not perform a binary selection but may e.g. apply a softer bias of resource from one mm wave radio communication link to another mm wave radio communication links in response to it being detected that they are associated with wireless modem MAC addresses that are linked to the same vehicle.

For example, a scheduling algorithm may be used that seeks to provide an even allocation of resources to all links for which the buffers hold pending data. However, for links that are detected to be associated with the same vehicle identity, the algorithm may be modified such that an increased number of time slots is allocated to links for which the buffer has more pending data than for links where the buffer has less pending data. However, time slots may be allocated to all links in all frames. Such an approach may e.g. reduce maximum delays for a given vehicle as it may reduce the risk of longer delays caused by buffering or even reduce error rates that may occur from overflowing buffers.

In many embodiments, the MAC layer scheduling may allocate air interface resource to mm wave radio communication links for the different MAC addresses in response to radio link condition indications for the mm wave radio communication links, such as one or more of signal to noise indications; signal strength indications; throughput indications, and error rate indications for the mm wave radio communication links.

A radio link condition indication for a mm wave radio communication link may be any indication of a radio condition and specifically a quality of the link and specifically may be any measure indicative of a signal to noise ratio, capacity, error rate, throughput, signal strength etc.

In some embodiments, a radio link condition indication may specifically be a throughput indication. The throughput indication may for example be determined as a throughput measure derived from measurements of a plurality of parameters.

For example, an access point may continuously determine the received signal to noise ratio or signal strength for each mm wave radio communication link to the vehicle. The access point may then convert this to a throughput value, e.g. based on a predetermined formula or Look-Up-Table (LUT). A throughput may be determined for each link and the scheduler may then allocate time slots to the links according to the throughput value, specifically with more time slots being allocated to links that currently indicate a high throughput.

In some embodiments, the throughput for a mm wave radio communication link may directly be measured and used as a radio link condition indication.

In many embodiments, a radio link condition indication for a mm wave radio communication link may be a currently applied modulation and coding scheme for the mm wave radio communication link. In many systems, the applied modulation and coding scheme used for communication is dynamically adapted in order to maximize the throughput of the mm wave radio communication link. For example, if the error rate increases above a given threshold, a control message may be transmitted to cause the modulation and coding scheme to be changed to a more reliable but lower data rate scheme and if the error rate decreases below a given threshold, a control message may be transmitted to cause the modulation and coding scheme to be changed to a less reliable but higher data rate scheme.

In such systems, the currently determined modulation and coding scheme may directly reflect a data rate for communication over the mm wave radio communication link. The currently selected/applied scheme may thus reflect the quality of the mm wave radio communication link. For example, the less the attenuation and noise, the higher the data rate.

In some embodiments, a beacon signal strength value may be used as a radio link condition indication. For example, the measured beacon signal strength may be reported back to the access point and converted into a specific measure indicative of the quality of a mm wave radio communication link such as a throughput or attenuation for that mm wave radio communication link.

Such a radio link condition indication may be particularly advantageous as it is not reliant on active transmission of data over the mm wave radio communication link. It may be used for a mm wave radio communication link which has been established but which is currently not active. In such a case, it is possible that no data is exchanged at all over the mm wave radio communication link. However, the wireless modem supporting the mm wave radio communication link may measure the beacon strength, such as e.g. the current RSSI level, and either use this directly or convert it to another value. For example, a predetermined formula or LUT may provide a throughput estimate or a modulation and coding scheme estimate as a function of the RSSI level.

In some scenarios, a vehicle identity may establish simultaneous mm wave radio communication links to different access points and in some embodiments the system may be comprise functionality for utilizing information of associated vehicle identities across multiple access points.

Figure 11:
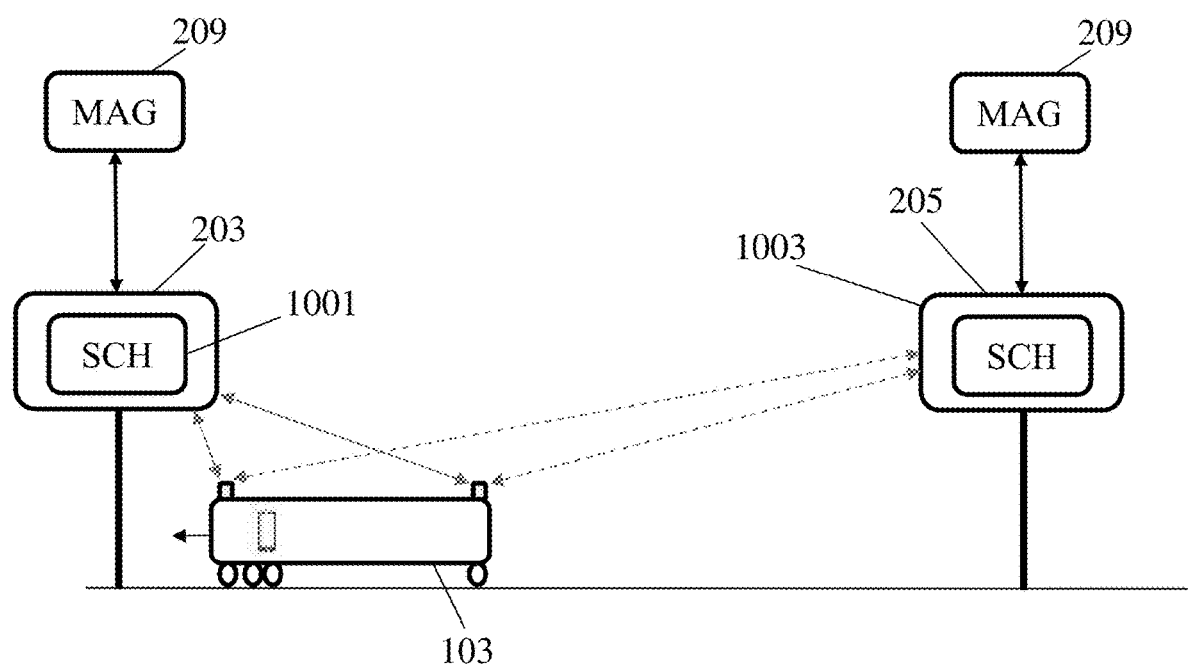
FIG. 11 illustrates an example of elements of a wireless communication system in accordance with some embodiments of the invention.

In the example of FIG. 11, the vehicle 103 has simultaneously established two mm wave radio communication links to the first access point 203 and two mm wave radio communication links to the second access point 205. Further, in the example the two access points 203 are coupled together 205 such that they can exchange data (in many embodiments, the coupling may be via a L2 network).

In the example, the first access point 203 is arranged to receive link indications not only for mm wave radio communication links of the first access point 203 but also for mm wave radio communication links of the second access point 205.

In some embodiments, the link indications may be received directly from the vehicle 103 such as e.g. by the vehicle 103 transmitting a dedicated message linking the vehicle identity to all MAC addresses of the wireless modems and data indicating which access point they have currently established a mm wave radio communication link to (e.g. the data message may comprise the MAC address of the access points that the individual wireless modems are communicating with). Thus, link indications may be received for all active mm wave radio communication links.

In other embodiments, the access points may exchange information indicating which vehicle identity is associated with the mm wave radio communication links that are currently established for the access point. For example, whenever a new link indication is received by a given access point, it may proceed to generate a message indicating the link indication and e.g. multicast this to a set of neighboring access points.

The first scheduler 1001 and(/or) the second scheduler 1003 may be arranged to perform the scheduling in response to the link indications for mm wave radio communication links of other access points.

Specifically, in many embodiments, the described approaches may be directly extended to consider mm wave radio communication links for multiple access points. For example, the first scheduler 1001 may identify a group of links to the same vehicle 103 including potentially links from different access points. It may then proceed to allocate resource/time slots to these links while taking into account that they are for the same vehicle 103. Specifically, the first scheduler 1001 may select to allocate resource only to the mm wave radio communication link of the group that currently has the highest throughput. In some embodiments, e.g. throughput information may be transmitted from one access point to the other with the scheduling being performed only by one access point and with the result being communicated to the other access point. For example, in many embodiments, the selection of a single mm wave radio communication link is made by one scheduler and communicated to the other scheduler(s) of access points that also have formed links to the vehicle 103. The scheduler for the access point of the selected mm wave radio communication link may then proceed to allocate resource to this link further considering other mm wave radio communication links. In other embodiments, each scheduler may individually select a mm wave radio communication link of the group and proceed to allocate resource if the selected link is one for which the scheduler is arranged to schedule air interface. For example, if sufficient information is distributed between schedulers and these apply the same selection algorithm, then all schedulers will individually reach the same conclusions and select different links as approach and thus no explicit information on the selection need to be communicated.

In some embodiments, the access point/schedulers may be arranged to perform scheduling in response to a consideration of (simultaneous) mm wave radio communication links to a plurality of vehicles. Thus, in many embodiments, the scheduler is arranged to detect that link indications have received that link MAC addresses for mm wave radio communication links to different vehicle identities and the scheduling may be performed in response to this detection.

Figure 12:
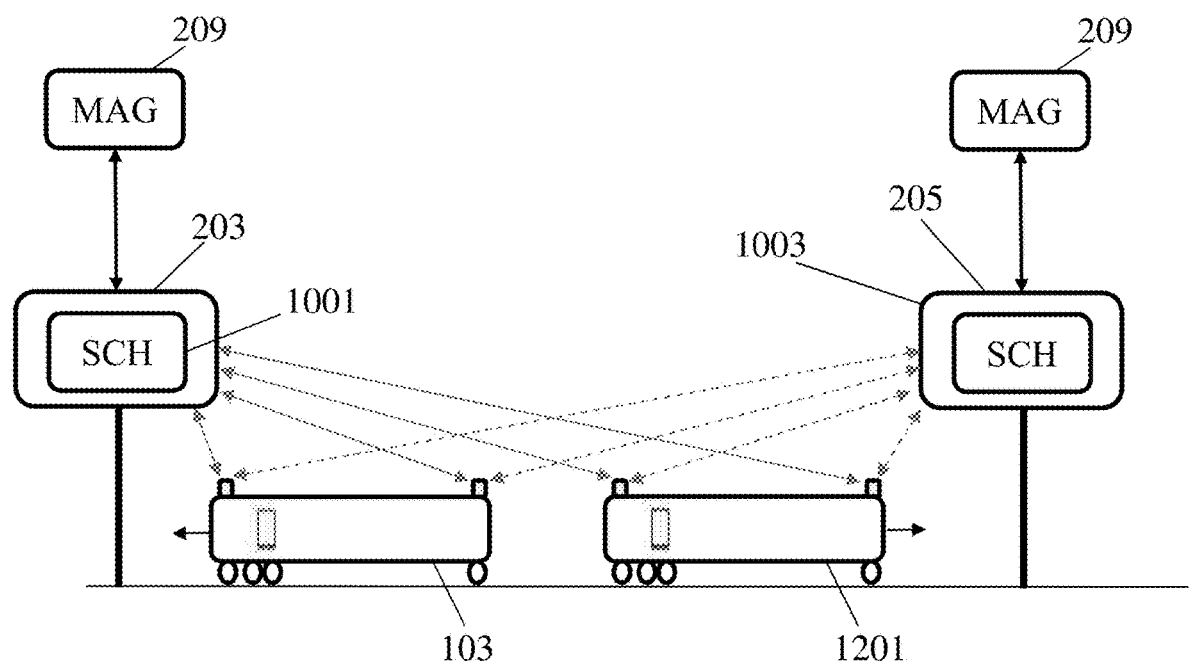
FIG. 12 illustrates an example of elements of a wireless communication system in accordance with some embodiments of the invention.

For example, as illustrated in FIG. 12, two vehicles 103, 1201 may be close to each other (e.g. two trains passing on adjacent tracks) and both have formed two links to respectively the first access point 203 and the second access point 205. In this case, each access point maintains four mm wave radio communication links and each vehicle 203, 1201 has also formed four links. In this case, scheduling over the mm wave radio communication links to one of the vehicles 103 may further take into account the mm wave radio communication links formed to other vehicles 1201.

In particular, in some embodiments, the scheduling performed by each of the schedulers may be for only one of the vehicles 103, 1201, i.e. the first access point 203 may be used for communication with only the first vehicle 103 and the second access point 205 may be used for only communication with the second vehicle 1201. This may in many embodiments facilitate scheduling but may in many scenarios also result in improved scheduling and resource usage.

In many embodiments, the selection of one access point to use for each vehicle of a pair of vehicles that can be served by a pair of access points may typically be in response to a throughput indication for the mm wave radio communication links to the two vehicles from the two access points.

For example, the system may determine the combined current throughput for each access point to vehicle combination. As another example, the system may determine the maximum current throughput for a single mm wave radio communication link for each access point-to-vehicle combination.

The selection of which access point to use for each vehicle may then be performed by considering a desired throughput behavior. For example, the access point that will result in the maximum combined throughput (to both vehicles) or the maximum single link throughput to the two vehicles may be selected. In some embodiments, such a selection may e.g. be subject to the requirement that a minimum throughput is achieved for each vehicle. In general, the resource allocation for the vehicles may in many embodiments be subject to a minimum air interface resource being allocated to each vehicle identity.

In some embodiments, the selection of access point for each vehicle may be in response to a number of properties. For example, in many embodiments, the current data rate requirement for each vehicle may be considered such that e.g. the maximum throughput is selected for the vehicle with the highest data rate requirement. It will be appreciated that many variations and decision criteria are possible and that the specific one will depend on the individual embodiment.

In many embodiments, once the access point for each vehicle has been selected, the scheduler for the appropriate access point will proceed to schedule air interface resource for the selected vehicle, and thus will typically be in dependence on potentially other vehicles.

In many embodiments, the previously described approaches for scheduling from a single access point to a vehicle may be used. For example, the scheduler may simply select the mm wave radio communication link with the highest current throughput and allocate all available resource to this link.

Thus, as a specific example, if the system detects that a pair of vehicles can be served by a pair of access points, it may first select the mm wave radio communication link that has the highest throughput for each of the access points to each of the vehicles. In the example of FIG. 12, this will result in a reduction in the number of possible links from 8 to 4 as one link from each access point to each vehicle is discarded (from the scheduling perspective, the modems shall remain associated to the respective access points) due to another link existing between these with a higher throughput. The four links thus represent the maximum throughput from each of the access points to each of the two vehicles. Due to the constraints that one link must be formed to each of the trains and that each of the two access points must form a link, this corresponds to two pairs of possible links. The system may then evaluate the combined throughput to the two vehicles for these two possibilities and select the one with the highest combined throughput. In this way, a single link is selected for each access point with the two access points ensuring that both vehicles have a link to one of the access points.

The described approaches may result in a flexible air interface resource allocation with adaptation of which links/paths/wireless modems are used to the current conditions. The approach may typically result in large variations in the throughput rates for individual L2 paths used for data packets. For example, data packets addressed to an end node via a MAC address of a first modem may be delayed substantially or possibly even be lost if that link is not scheduled for some time (or perhaps permanently). In many embodiments, functionality may be included which mitigates this effect.

In some embodiments, the MAC layer scheduling may be arranged to schedule data addressed to one MAC address over a mm wave radio communication link for another MAC address. Specifically, if it is detected that a set of mm wave radio communication links and associated wireless modem MAC addresses are for the same vehicle, data packets addressed to one of these may be rerouted via one of the other links of the group. Thus, specifically, the scheduler may move data packets from the queue/buffer of a link to which no air interface is scheduled to the queue/buffer of a link to which air interface is scheduled. Specifically, if all air interface resource is allocated to a single selected mm wave radio communication link/wireless modem, the scheduler may in some embodiments also move all data packets for the vehicle to the queue of the selected link.

In such embodiments, the scheduler may further be arranged to modify the data packets, e.g. by encapsulating them in a MAC header using the path of the selected link or by directly changing the wireless modem MAC addresses comprised in the data packets.

In some embodiments, the network (specifically the fixed network or the vehicle network dependent on the direction of data transmission) may comprise a path manager which is arranged to adapt a routing for data for a vehicle in response to at least one of a throughput and round trip time for a route that includes a given MAC address for a given modem. The adaptation may specifically be such that the route is changed from including the MAC address of the wireless modem to include the MAC address of another wireless modem on the same vehicle.

The path manager may specifically detect that the throughput is below a threshold or that a round trip time exceeds a given threshold. Flow control signaling may indicate the volume of queued traffic, or the sequence number of the last transmitted packet. These may be indicative of the mm wave radio communication link associated with the current routing and wireless modem MAC address is not receiving any (or sufficient) air interface resource resulting in a delay or possible data loss (e.g. due to buffer overflow). In response, the path manager may be arranged to modify the routing such that it uses a different (and active) mm wave radio communication link. In many embodiments, the system may further be arranged to retransmit a number of data packets already transmitted on the previous route using the new adapted route.

In some embodiments, the path manager may be a L2 MAC based routing functionality which e.g. may adapt the routing using ARP messaging. This may provide a low complexity implementation with fast and localized adaptation.

However, in other embodiments, the path manager may alternatively or additionally be arranged to perform a layer 3 or higher routing update. For example, the path manager may be an IP and/or UDP/TCP function that detects that a current routing has a high delay or low throughput and therefore may adapt the routing. The approach may accordingly adapt the routing e.g. in the same way as may typically be the case when radio links drop due to the vehicle movement.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

We claim:

1. A communication system for supporting communication between at least one end node of a first vehicle and at least one remote correspondent node via a fixed network, the communication system comprising:
   a plurality of wireless access points being part of the fixed network, each access point of the plurality of wireless access points having a directional antenna arrangement for mm wave radio communication using directional beams;
   a number of wireless modems, each wireless modem being located on the first vehicle and arranged to establish a mm wave radio communication link to an access point of the plurality of access points using an electronically steerable beamforming directional antenna, each wireless modem being part of a first vehicle network of the first vehicle;
   wherein the first vehicle network is arranged to transmit link indications to at least one of the plurality of access points, a link indication providing a link between a MAC address of a wireless modem of the number of wireless modems and a first vehicle identity indication for the first vehicle; and wherein
   a first air interface scheduler for a first access point of the plurality of access points for performing MAC layer scheduling over mm wave radio communication links established for the first access point in response to the first vehicle identity indication.

2. The communication system of claim 1, wherein the first vehicle network is arranged to transmit a first link indication for a first mm wave radio communication link established between the first access point and a first wireless modem via the first mm wave radio communication link.

3. The communication system of claim 1, wherein the first access point is arranged to receive link indications for a second access point; and the MAC layer scheduling of the first air interface scheduler is arranged to perform the scheduling in response to the link indications for the second access point.

4. The communication system of claim 3, wherein the first access point is arranged to receive the link indications for the second access point from the second access point.

5. The communication system of claim 1, where the first access point is arranged to transmit link indications for the first access point to a second access point.

6. The communication system of claim 1, wherein the first access point is arranged to receive link indications only for MAC addresses of wireless modems for which the first access point has established a mm wave radio communication link.

7. The communication system of claim 1, wherein the first access point is arranged to detect that link indications have been received linking a plurality of different MAC addresses to the first vehicle and first scheduler is arranged to perform the MAC layer scheduling in response to the detection.

8. The communication system of claim 7, wherein the scheduler is arranged to select a mm wave radio communication link from the mm wave radio communication links of the plurality of different MAC addresses for communication with the first vehicle.

9. The communication system of claim 7, wherein the first scheduler is arranged to bias resource from a first mm wave radio communication link for a first of the plurality of different MAC addresses to a second mm wave radio communication link for a second of the plurality of different MAC addresses.

10. The communication system of claim 7, wherein the first scheduler is arranged to allocate air interface resource to mm wave radio communication links for the plurality of different MAC addresses in response to radio link condition indications for the mm wave radio communication links.

11. The communication system of claim 10, wherein the radio link condition indications comprise at least one of:
 signal to noise indications for the mm wave radio communication links;
 signal strength indications for the mm wave radio communication links;
 throughput indications for the mm wave radio communication links; and
 error rate indications for the mm wave radio communication links.

12. The communication system of claim 7, wherein the first scheduler is arranged to schedule data addressed to a first MAC address of the different MAC addresses over a mm wave radio communication link for a second MAC address of the plurality of different MAC addresses.

13. The communication system of claim 7, wherein the first scheduler is arranged to not schedule data addressed over at least one mm wave radio communication link for a first MAC address of the plurality of different MAC addresses in response to the detection.

14. The communication system of claim 1, wherein at least one of the fixed network and the vehicle network comprises a path manager for adapting a route comprising a first MAC address for a wireless modem of the plurality of wireless modems to not include the first MAC address in response to at least one of a throughput and round trip time for the route including the first MAC address being below a threshold.

15. The communication system of claim 14, wherein the path manager is arranged to perform a layer 3 or higher routing change.

16. The communication system of claim 14, wherein the path manager is arranged to perform a layer 2 routing change.

17. The communication system of claim 1, wherein the first access point is arranged to detect that link indications have been received that link MAC addresses to different vehicle identities, and the first scheduler is arranged to perform the MAC layer scheduling in response to the detection.

18. The communication system of claim 17, wherein the first scheduler is arranged to allocate a minimum air interface resource to each vehicle identity of the different vehicle identities.

19. The communication system of claim 17, wherein the first scheduler is arranged to detect that mm wave radio communication links are established to two vehicles to which a second access point has also established mm wave radio communication links; and the first scheduler is arranged to schedule air interface resource to only one of the two vehicles.

20. The communication system of claim 19, wherein the first access point is arranged to select the one of the two vehicles in response to throughput indications for the mm wave radio communication links to the two vehicles from both the first access point and the second access point.

21. A fixed network for a communication system supporting communication between at least one end node of a first vehicle and at least one remote correspondent node via the fixed network, the fixed network comprising:
 a plurality of wireless access points being part of the fixed network, each access point of the plurality of wireless access points having a directional antenna arrangement for mm wave radio communication using directional beams;
 wherein the plurality of wireless access points are arranged to receive transmit link indications for mm wave radio communication links from a number of wireless modems located on the first vehicle and arranged to establish a mm wave radio communication links with the plurality of wireless access points, a link indication providing a link between a MAC address of a wireless modem of the number of wireless modems and a first vehicle identity indication for the first vehicle; and the fixed network further comprising:
 an air interface scheduler for a first access point of the plurality of access points for performing MAC layer scheduling over mm wave radio communication links established for the first access point in response to the first vehicle identity indication.

22. An apparatus for a communication system supporting communication between at least one end node of a first vehicle and at least one remote correspondent node via a fixed network, the apparatus being located on the first vehicle and comprising:
 a number of wireless modems, each wireless modem being located on the first vehicle and arranged to establish a mm wave radio communication link to an access point of a plurality of access points using an electronically steerable beamforming directional antenna, each wireless modem being part of a first vehicle network of the first vehicle; and wherein the apparatus is arranged to transmit link indications to at least one of the plurality of access points, a link indication providing a link between a MAC address of a wireless modem of the number of wireless modems and a first vehicle identity indication for the first vehicle.

23. A method of operation for a communication system for supporting communication between at least one end node of a first vehicle and at least one remote correspondent node via a fixed network, the communication system comprising:

a plurality of wireless access points being part of the fixed network, each access point of the plurality of wireless access points having a directional antenna arrangement for mm wave radio communication using directional beams;

a number of wireless modems, each wireless modem being located on the first vehicle and arranged to establish a mm wave radio communication link to an access point of the plurality of access points using an electronically steerable beamforming directional antenna, each wireless modem being part of a first vehicle network of the first vehicle; the method comprising:

the first vehicle network transmitting link indications to at least one of the plurality of access points, a link indication providing a link between a MAC address of a wireless modem of the number of wireless modems and a first vehicle identity indication for the first vehicle; and a first air interface scheduler for a first access point of the plurality of access points performing MAC layer scheduling over mm wave radio communication links established for the first access point in response to the first vehicle identity indication.

* * * * *